(12) United States Patent
Bunton

(10) Patent No.: US 8,996,075 B2
(45) Date of Patent: Mar. 31, 2015

(54) RETRIEVABLE HEADSET STORAGE CASE FOR A PORTABLE ELECTRONIC DEVICE

(71) Applicant: Jaleel Bunton, Miami, FL (US)

(72) Inventor: Jaleel Bunton, Miami, FL (US)

( * ) Notice: Subject to any disclaimer, the term of this patent is extended or adjusted under 35 U.S.C. 154(b) by 94 days.

(21) Appl. No.: 13/672,666

(22) Filed: Nov. 8, 2012

(65) Prior Publication Data

US 2014/0128128 A1 May 8, 2014

(51) Int. Cl.
*H04M 1/00* (2006.01)
*H04B 1/08* (2006.01)
*H01Q 1/24* (2006.01)
*H04M 1/02* (2006.01)

(52) U.S. Cl.
CPC ............. *H01Q 1/24* (2013.01); *H04M 1/0202* (2013.01)
USPC ....................... 455/569.1; 455/348; 455/575.1

(58) Field of Classification Search
CPC ............ H04M 1/6058; H04M 1/0258; H04M 1/0254; H04M 1/72563; H04M 1/00; H04R 1/1033; H04R 1/1041; H04R 1/083; H04R 1/105; H04R 5/033; H04B 1/08
USPC .......... 455/569.1, 575.1, 575.3, 575.6, 575.8, 455/90.3, 550.1, 348, 347
See application file for complete search history.

(56) References Cited

U.S. PATENT DOCUMENTS

| | | | |
|---|---|---|---|
| 5,881,149 A | 3/1999 | Weatherill | |
| 6,698,560 B2 | 3/2004 | Reardon | |
| 6,712,304 B1 * | 3/2004 | Taylor | 242/379 |
| 6,731,956 B2 * | 5/2004 | Hanna et al. | 455/569.1 |
| 6,942,173 B1 | 9/2005 | Abramov | |
| 7,108,544 B2 | 9/2006 | Zoller | |
| 7,120,476 B2 * | 10/2006 | Yoo | 455/575.1 |
| 7,515,706 B2 * | 4/2009 | Park | 379/430 |
| 7,539,302 B2 | 5/2009 | Kulas | |
| 2004/0204165 A1 * | 10/2004 | Huang | 455/569.1 |
| 2005/0255898 A1 | 11/2005 | Huang | |
| 2007/0023559 A1 | 2/2007 | Scapillato | |
| 2007/0293288 A1 | 12/2007 | Lin | |
| 2008/0099229 A1 | 5/2008 | Scifo | |
| 2009/0197650 A1 | 8/2009 | Kulas | |
| 2010/0173682 A1 | 7/2010 | Ashton | |
| 2010/0245585 A1 * | 9/2010 | Fisher et al. | 348/164 |
| 2013/0237290 A1 * | 9/2013 | Simmons et al. | 455/569.1 |

* cited by examiner

*Primary Examiner* — Pablo Tran
(74) *Attorney, Agent, or Firm* — Henry J. Cittone; Cittone & Chinta LLP

(57) ABSTRACT

A case is provided for accommodating a portable electronic device and at least one accessory of the portable electronic device. The case provides a holder configured for holding a portable electronic device, the holder having a front panel and a back panel; a retraction system for allowing at least part of a cable portion an accessory to be retracted. Further provided is an ultra thin winding mechanism contained in a enclosure within the case where the audio output is connected via contacts on the back of the spool and contacts on the lining of the case, a button located on the case which engages audio by being adjacent to and in contact with the portable electronic device's audio button, a second button which operates to simultaneously disengage audio and retract the cable, and a microphone installed within the accessory.

12 Claims, 4 Drawing Sheets

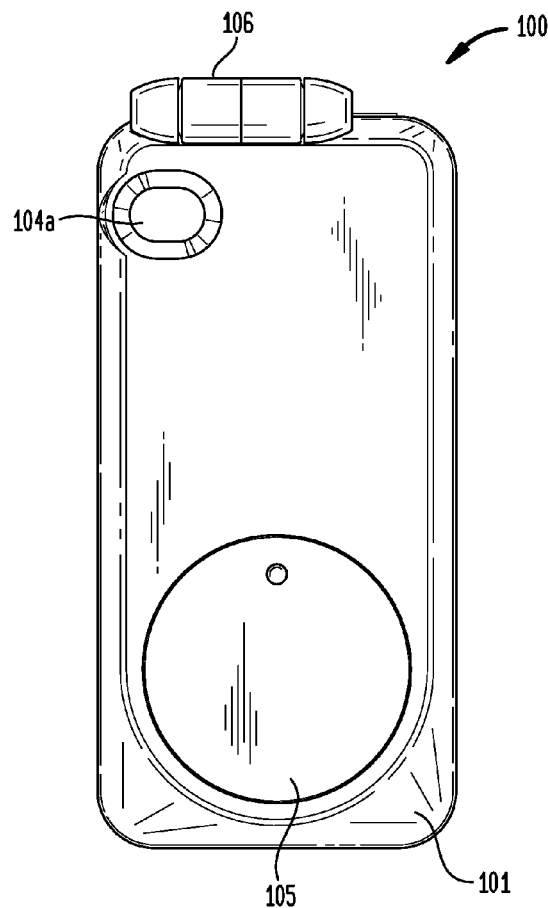
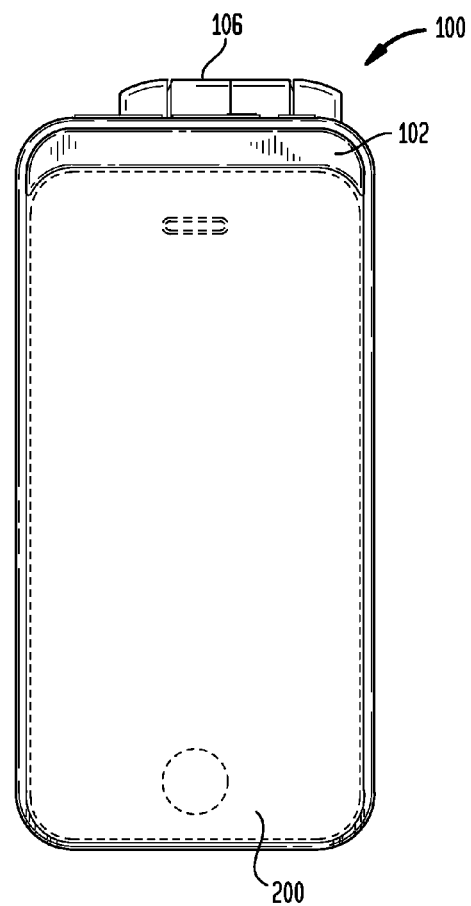

RETRIEVABLE HEADSET STORAGE CASE FOR A PORTABLE ELECTRONIC DEVICE

FIELD OF THE INVENTION

The present invention concerns mobile or cellular phone or other portable electronic device holders which allow for storage and retraction of headset cords while maintaining a slim profile for the holder and allowing the user to switch between audio modes.

BACKGROUND

Mobile phones and other handheld electronic devices have become indispensable—being utilized by everyone worldwide and existing in immeasurable numbers due to their practicality, increasing cost effectiveness and convenience of use. However, the use of cellular phones is not without inherent risks. For example, many individuals make and receive cellular calls while driving. This action necessarily requires the use of at least one hand to operate and/or hold the cellular phone, substantially increasing the risk of an automobile accident causing possible injury to oneself and others. In addition, overexposure to cellular radiation has become a recognized phenomenon warranting consumer concern.

Thus, a need has arisen for a means by which a cellular phone can be utilized in a "hands-free" manner. Hands-free is understood to mean the ability to transmit and receive audio signals through a cellular phone without the user having to manually hold the cellular phone. One development for cellular phones to address this issue is an integrated speakerphone function. The speakerphone function of cellular phones has become widely used, especially during walking, working or driving a car. The speakerphone function provides the safety of the user in using the phone, especially during driving. However, even with the speakerphone functions, there have been some limitations.

One of the main limitations with the speakerphone function is poor audio quality, especially when the phone is at a distance from the user. In a conventional speakerphone implementation, the main components include a phone cradle, a loudspeaker to broadcast audio signals from the phone and a microphone to receive audio signals (i.e. signal containing the user's voice). The use of the loudspeaker increases ambient noise due to additional feedback that is created in closed areas, particularly in automobiles where phones are commonly used. Even outside of a closed environment, ambient noise is a problem as open spaces create opportunities for many other different types of sounds to affect audio performance. Further, privacy concerns do not always allow the user to utilize the speakerphone function.

To overcome problems associated with speakers, earpiece(s) have been used in conjunction with phones to provide better quality audio reception. These earpieces may be used in conjunction with cell phone holders that hold the phone in place in an automobile or on a user. The earpiece(s) are typically connected to the phone with a cord that transmits the audio signals between the phone and the user's ear. Unfortunately, the earpiece and cord combination create a unique set of problems that bring further limitations.

One such problem is the placement of the earpiece when not in use. If the phone is not in a cradle while it is an automobile, the earpiece and phone may move around the interior and create a dangerous situation for one attempting to answer a call or otherwise use the phone and earpiece while driving. The phone and earpiece may not remain together in the automobile and therefore locating the phone and earpiece may create a distraction while driving. Another problem is that the cord becomes a distraction to a driver since the cord may become tangled or looped around other devices in the automobile. If this happens, problems will occur when a call arrives and the user tries to answer the incoming call when the earpiece cord becomes tangled. Yet another problem is the inconvenience caused by the length of the cable of the earpiece. Often, because the length of the cable must be long enough to reach from the waist of the user to their ear, the cable must be at least two or three feet in length. When not in use, this length of cable becomes a nuisance, often catching on protrusions and tearing the phone out of the user's pocket or the earpiece out of the user's ear. Thus, with current earpieces, considerable wrapping and tangling occurs with the cables. Many times an individual will lose or break the earpiece because there is no proper storage while it is not in use.

Although existing cable storage systems exist, they are often bulky and prone to entanglement of the cable during use. For example, one approach is the utilization of a reel around which the cable is wound when the cable is not in use. The spool includes a spring that is tensioned when the user pulls out the cable. Thereafter, the cable is rewound as the tension of the spring is released. However, such reel or spool systems are bulky and when implemented together with a protective case for the cell phone handset vastly increase the bulk of the device. Additionally existing systems lack a place to dock both ends of the earpiece, the speaker and the plug, as most cell phones in use today lack a convenient switch to turn the earpiece on or off, and thus require that it be unplugged. There is therefore a need to overcome the issues noted above.

SUMMARY

In one aspect of the present invention, a case is provided for accommodating a portable electronic device and at least one accessory of the portable electronic device is provided. The case includes: a holder configured for accommodating the portable electronic device, the holder comprising a housing and a back panel; a retractile member fixed within a panel of the holder for allowing at least part of a cable portion of the at least one accessory to be wound around, the retractile member comprising a spool and an operable portion for keeping the coiled cable portion in position around the spool; and a button which switches the portable electronic device between audio modes.

In another aspect of the present invention, the protective apparatus may further include: an ultra thin winding mechanism contained in a enclosure within the case where the audio output is connected via contacts on the back of the spool and contacts on the lining of the case, a first button located on the case which engages audio by being adjacent to and in contact with the portable electronic device's audio button, a second button which operates to simultaneously disengage audio and retract the cable, and a microphone installed within the accessory.

BRIEF DESCRIPTION OF THE DRAWINGS

FIG. 3 is back view of an embodiment of the present invention.

FIG. 4 is a front view of an embodiment of the present invention.

DETAILED DESCRIPTION

Figure 1:
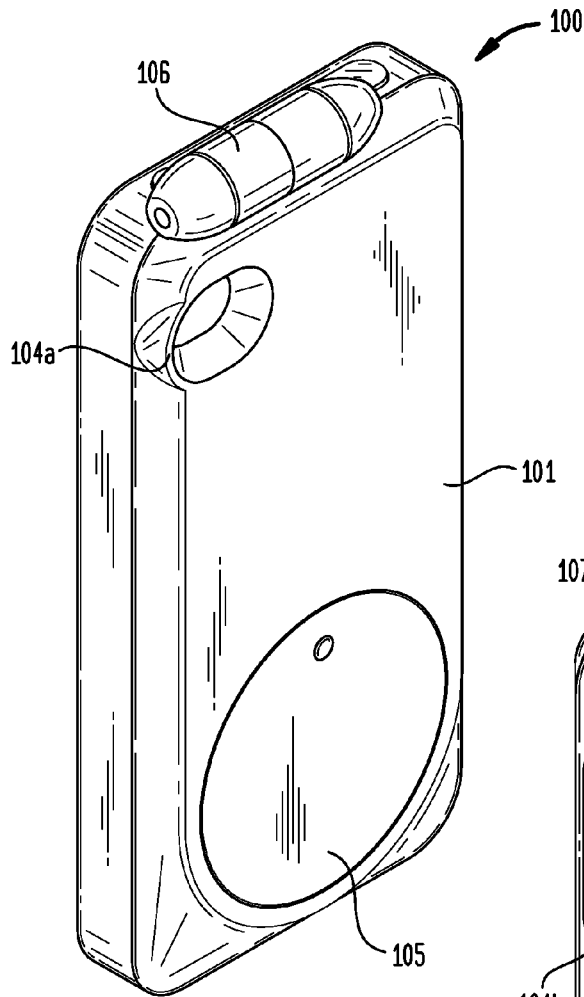
FIG. 1 is a perspective view of the back and sides of an embodiment of the present invention.

In one aspect, the present invention provides a compact case for a portable electronic device such as a mobile or cell phone, smart phone or other computing device that provides for more convenient hands-free operation by a user by providing for the winding of accessory cords such as earpieces into the case body. In another aspect the present invention also provides for engagement and disengagement of earpiece audio functions via a button, which may also serve to retract the ear piece/microphone cord when disengaging the earpiece/microphone audio. It is understood that the ear piece may or may not also have a microphone.

Referring now to FIGS. 1-9, an embodiment of the present invention is illustrated in the form of a mobile phone 100. The mobile phone case 100 comprises a housing 101 and a backing plate 102 which forms a pocket 103 suitable for holding a mobile phone 200. The mobile phone 200 is preferably held in place in pocket 103 by means of friction. The mobile phone case 100 is composed of a suitable polymer of the type typically used for mobile phone cases, such as: thermoplastics, for example polycarbonates; polycarbonate/acrylonitrile butadiene styrene (PC/ABS); high-density polyethylene; acrylonitrile butadiene styrene or silicone. It is understood that mobile phone case 100 described herein may be configured to hold any number of portable electronic devices, and that the embodiment comprising a mobile phone case is described herein for convenience and by way of example.

Figure 2:
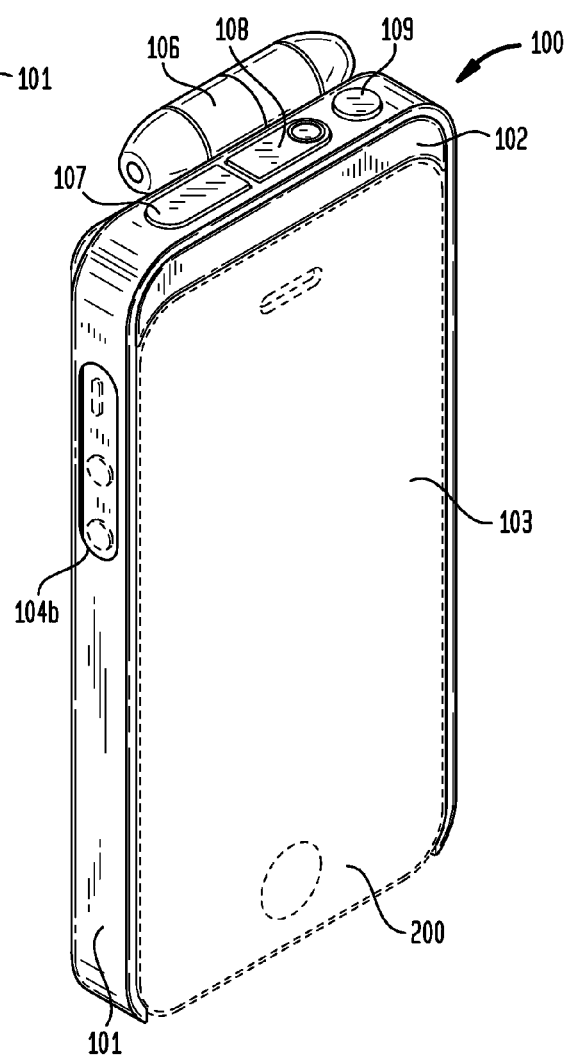
FIG. 2 is a perspective view of the front and sides of an embodiment of the present invention.
Figure 5:
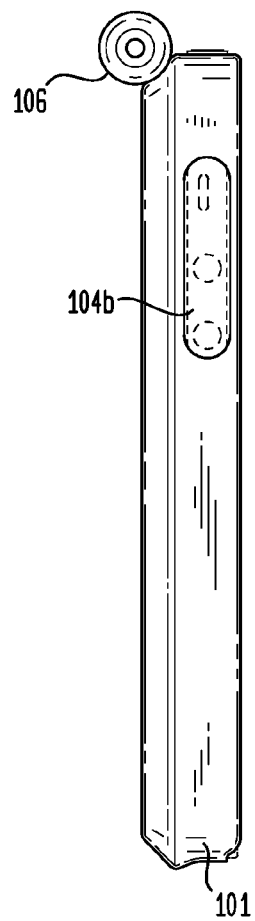
FIG. 5 is a side view of an embodiment of the present invention.
Figure 6:
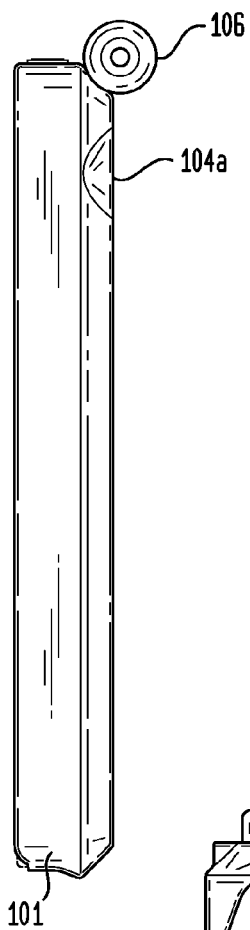
FIG. 6 is a another side view of an embodiment of the present invention.
Figure 7:
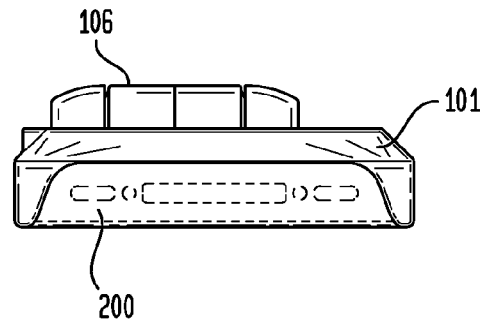
FIG. 7 is a bottom view of an embodiment of the present invention.
Figure 8:
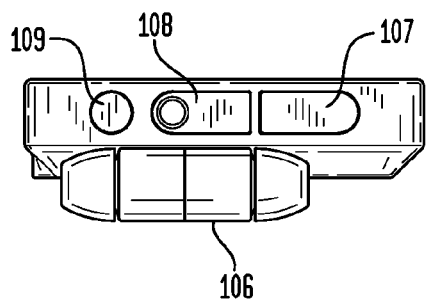
FIG. 8 is a top view of an embodiment of the present invention.

Referring more particularly to FIGS. 1 and 2, and to the housing 101, the housing 101 comprises a spool 105, an output device 106 (also referred to herein as a headset), which may be an ear piece or other sound delivery system and may optionally have a microphone, in which case it is an input/output device (also referred to herein as a headset), and an aperture 104a, suitable to allow for the camera functionality of the mobile phone 200. It is understood that the aperture for the mobile phone camera may be located at any position on the mobile phone case 100 as necessary to allow for use of camera functionality. The backing plate 102 is substantially open, forming a frame to hold the mobile phone 200 within the pocket 103 while covering the internal components located between it and the housing 101.

The housing 101 may have one or more apertures 104b to allow access to input, output and control features of the mobile phone, such sockets, jacks, control buttons, switches or mechanisms, such that none are concealed or covered or otherwise unusable. The housing 101 further includes a jack switch 107, a pivot 108, and optionally a power button 109. Alternatively, an aperture may be provided to access the power function on the phone in place of power button 109.

The jack switch 107 is preferably a push button which drives a plug into the headset connection port of the mobile device 200, but may be any type of switch suitable to drive a plug into the headset connection of the mobile device 200, thus operating as an audio connection switch. Depressing the button after it is engaged releases the plug from the headset connection port. Preferably the jack switch 107 is spring operated so that is may move between an engaged and disengaged state.

Figure 9:
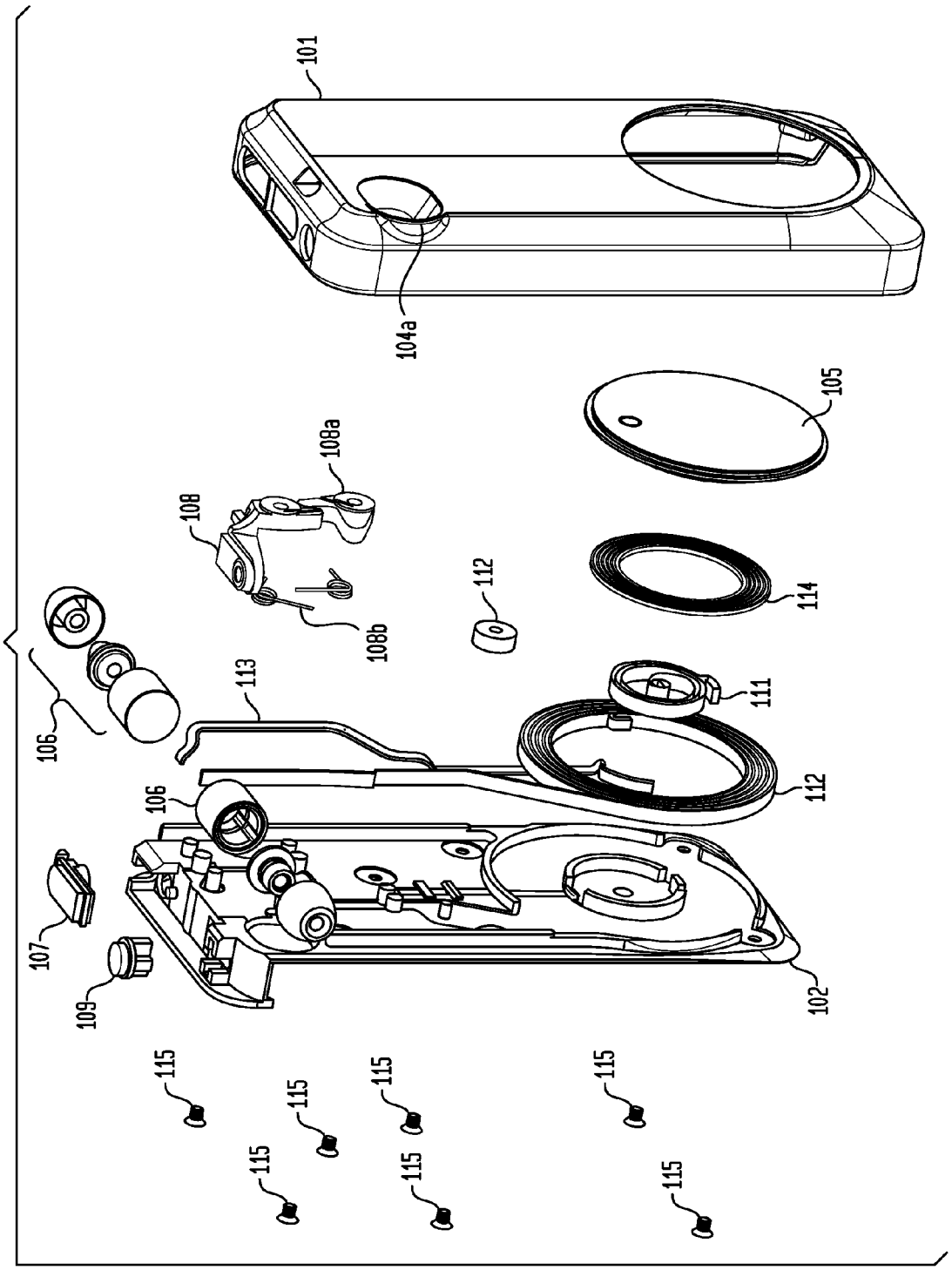
FIG. 9 is an exploded view of an embodiment of the present invention.

Referring now to FIG. 9, the spool 105 is connected to a mount located on the backing plate 102, said mount holding the spool's axle and a power spring 111. A cable 112 for input/output device 106 is wound around spool 105. A board 114 having contact rings is mounted parallel to the spool 105 and rotates in conjunction with spool 105. Backing plate 102 and housing 101 are held together by fasteners 115 or other suitable means such as glue or snap connections.

The pivot 108 serves to retract the cable 112 by removing tension from the cable 112 when it is depressed, thus functioning as a headset retraction switch. Pivot 108 having a spring 108b operates a cam 108a also having a spring 108b thereby removing the tension holding cable 112 in place and allowing it to self-wind onto spool 105. Any suitable means of releasing the cable 112 may be employed. A roller 115 may be employed to keep cable 112 aligned. Pivot 108 also disengages the jack switch 107, such that when a user retracts the headset cable, they also remove the plug from the headset connector on the mobile phone 200, resulting in the return of the audio output and, optionally, input functions to the mobile phone 200.

Electrical connections to the mobile phone 100 may be made as follows to deliver signals to the speakers and receive signals from the microphone: power from the jack switch 107 is fed through cable 113 which is equipped with conductors which supply contacts that bear against contact rings on a board 114 which rotates with the spool 105. Power is then fed from the contact rings of the board 114 to the cable 112. Other suitable means of transferring signals and power from the stationary jack switch 107 to the rotatable cable 112 are readily apparent to one of ordinary skill in the art, including for example the disclosure of U.S. Pat. No. 6,149,096, the disclosure of which is hereby incorporated by reference in its entirety.

In order to use the foregoing embodiments of the present invention, a user presses the jack switch 107 which engages the plug into the mobile phone 200's headset connection port. Engaging the plug may also disengage the phone's built in audio functions, which are now handled by the headset 106. The user then draws out the headset 106 by its cable 112 and proceeds to use it, by for example placing the earphones/earbuds upon or into their ears and the optional microphone near their mouth in the conventional manner. Calls may then be dialed or received, or music or other audio played. For example, upon receiving an incoming call the user presses jack switch 107, to engage the headset audio and draws out and places the headset upon themselves. In this manner a call may be answered with hands free operation thereafter. Upon completing a call, the user then removes the earpieces/earbuds and presses pivot 108 which simultaneously terminates the connection of the headset 106 to the mobile phone 200 by causing the plug to be withdrawn and also retracts the cable 112, drawing the headset 106 back into its resting position on the housing 101.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

The invention claimed is:

1. A portable electronic device case comprising:
  (a) a housing,
  (b) a back plate,
  (c) a headset having a retractable cable
  (d) an audio connection switch, and
  (e) a headset cable retraction switch wherein the housing is configured to fit a portable electronic device and the headset cable retraction switch disengages the audio connection switch without terminating audio play.

2. The portable electronic device case of claim 1 wherein the headset further comprises a microphone.

3. The portable electronic device case of claim 1 wherein the retractable cable is wound upon a spool.

4. The portable electronic device case of claim 3 wherein the spool is powered by a power spring.

5. The portable electronic device case of claim 1 wherein the headset cable retraction switch releases tension on the retractable cable when engaged.

6. The portable electronic device case of claim 1 wherein the retractable headset is a pair of earbuds.

7. A mobile phone case comprising:
(a) a housing for a mobile phone,
(b) a back plate,
(c) a headset having a retractable cable
(d) an audio connection switch, and
(e) a headset cable retraction switch
wherein the housing is configured to fit a portable electronic device and the headset cable retraction switch disengages the audio connection switch without terminating audio play.

8. The portable electronic device case of claim 7 wherein the headset further comprises a microphone.

9. The portable electronic device case of claim 7 wherein the retractable cable is wound upon a spool.

10. The portable electronic device case of claim 9 wherein the spool is powered by a power spring.

11. The portable electronic device case of claim 7 wherein the headset cable retraction switch releases tension on the retractable cable when engaged.

12. The portable electronic device case of claim 7 wherein the retractable headset is a pair of earbuds.

* * * * *